United States Patent [19]
Hewitt et al.

[11] 3,871,514
[45] Mar. 18, 1975

[54] SAFETY BRAKE APPARATUS FOR BELT CONVEYOR

[75] Inventors: John H. Hewitt, Suffield; Ernest D. Johnson, Tallmadge, both of Ohio

[73] Assignee: The Goodyear Tire & Rubber Company, Akron, Ohio

[22] Filed: July 5, 1973

[21] Appl. No.: 376,423

[52] U.S. Cl. ............................................... 198/232
[51] Int. Cl. ........................................... B65g 43/00
[58] Field of Search ............. 198/232, 227; 64/30 E; 254/173 R

[56] References Cited
UNITED STATES PATENTS

| | | | |
|---|---|---|---|
| 1,566,475 | 12/1925 | Handy et al. | 198/232 X |
| 1,682,014 | 8/1928 | Margles et al | 198/232 |
| 1,729,079 | 9/1929 | Margles | 198/232 |
| 2,259,366 | 10/1941 | Dunlop | 198/232 X |
| 2,472,925 | 6/1949 | Spase | 64/30 E |
| 3,261,589 | 7/1966 | Neumeier | 254/173 R |
| 3,666,074 | 5/1972 | Johnson | 198/232 X |

Primary Examiner—Robert B. Reeves
Assistant Examiner—Hadd S. Lane
Attorney, Agent, or Firm—Oldham & Oldham

[57] ABSTRACT

A safety brake apparatus for stopping a conveyor belt in the event of a drive chain failure comprises at least one drum which engages the conveyor and a ratchet assembly which is mounted on the drum. Attached to the ratchet assembly is a brake member which engages the drum. Mounted juxtaposition to the ratchet is a pawl bar. A member which detects a break in the drive chain causes the pawl bar to rotate and contact the ratchet so that through the brake member the conveyor drum is slowed and stopped.

12 Claims, 4 Drawing Figures

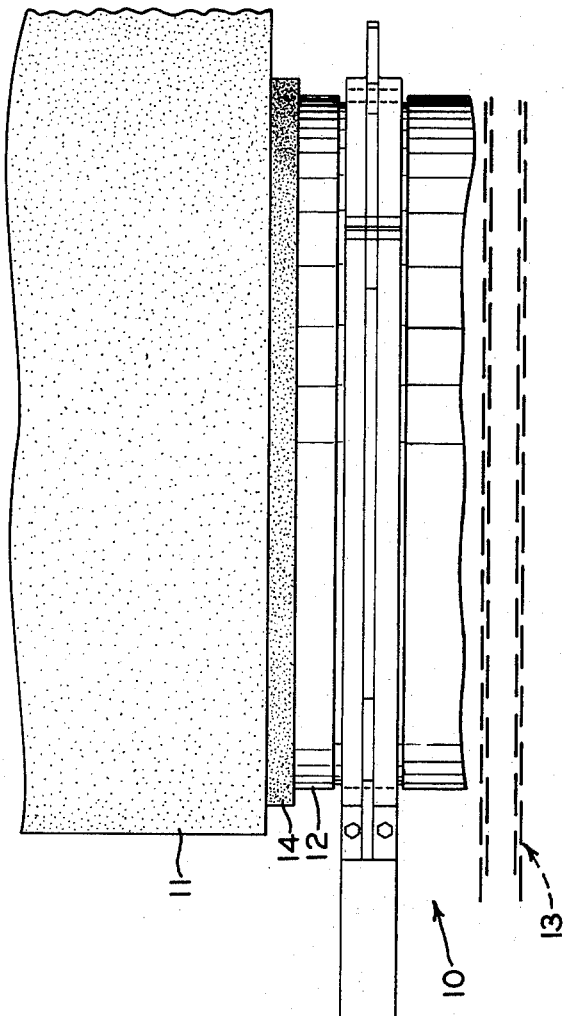
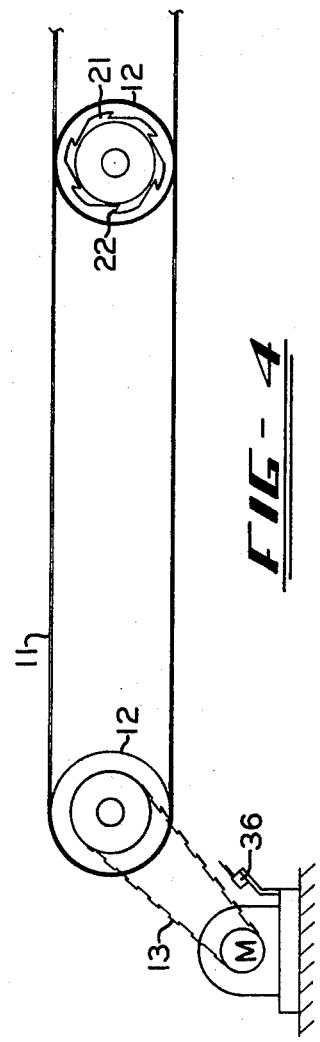
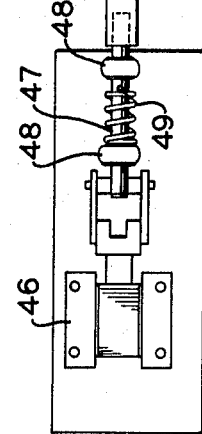
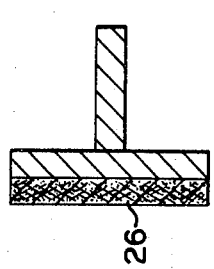

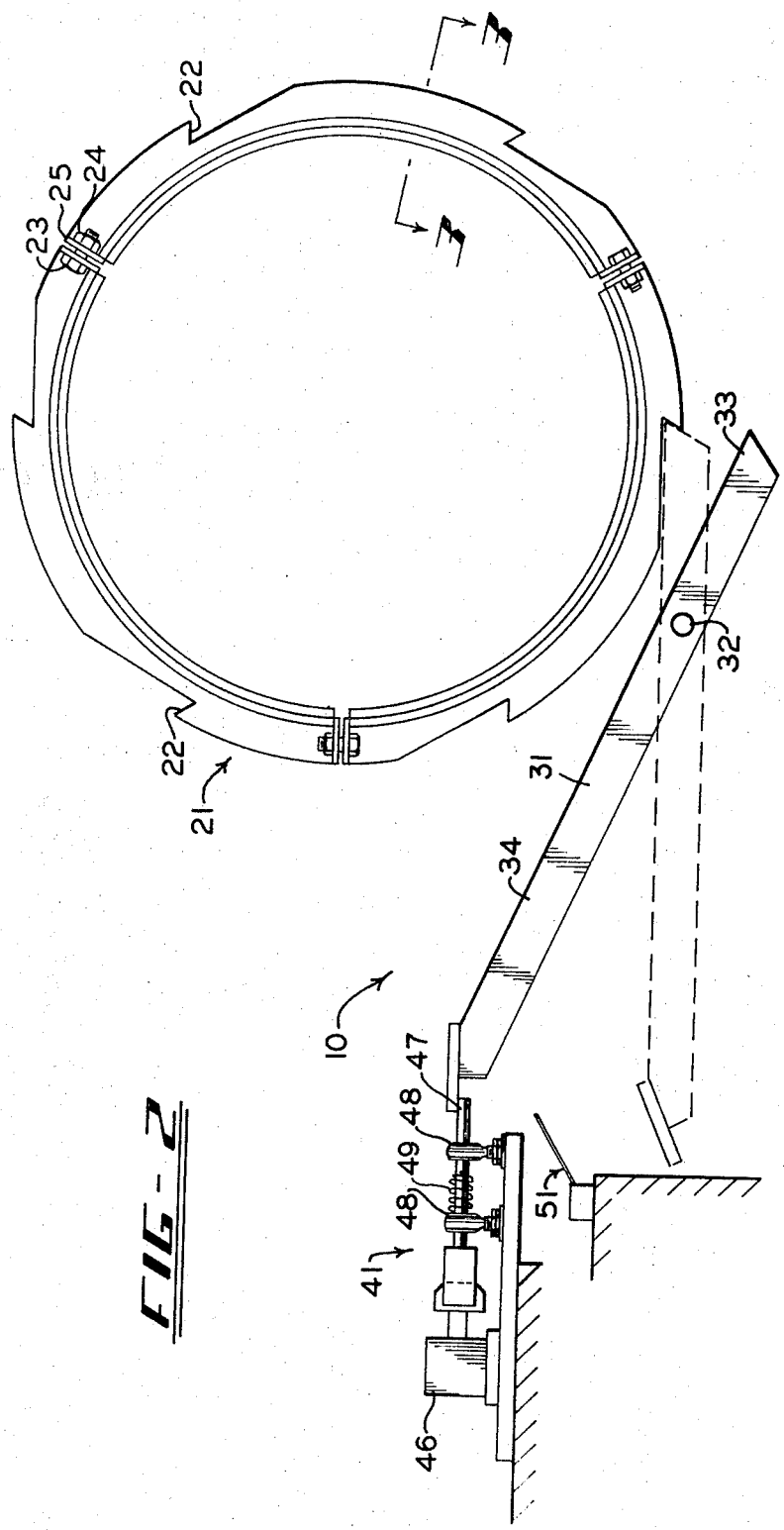

SAFETY BRAKE APPARATUS FOR BELT CONVEYOR

BACKGROUND OF THE INVENTION

The present invention relates to a safety brake for a belt conveyor. More specifically, the present invention relates to a safety brake apparatus which upon failure of a conveyor drive chain causes the conveyor belt to be stopped to prevent the drive chain from being damaged.

Conveyor belts are generally used for a number of load transferring operations such as the transporting of crushed rock, ores, machined items, people and the like. Many times, such conveyor belts are driven by a drive chain which is usually connected to one or more conveyor belt drums and to a power source such as a motor. Typically, the drive chains are comprised of a series of links. Upon failure or breakage of a link, the conveyor ceases to be driven. In any event, continued operation of the power source for even a short period of time after the chain breaks generally causes damage to the chain as well as to other components of the conveyor belt system. Moreover, and more important, continued operation of the conveyor belt can cause damage to the load and personal injury if people are being conveyed.

SUMMARY OF THE INVENTION

It is therefore, an object of the present invention to provide a safety brake for a conveyor system which upon the failure of the drive chain causes the drive chain and the conveyor belt to stop, and maintains the belt in such stopped condition.

It is also an object of the present invention to provide a safety brake for a conveyor system as above, in which the drive chain is immediately stopped and the conveyor belt is gently brought to a stop.

It is a further object of the present invention to provide a safety brake for a conveyor system which is inexpensive to produce and automatic in operation.

These and other objects of the present invention, together with the advantages thereof of existing and prior art forms which will become apparent from the following specification, are accomplished by the improvements hereinafter described and claimed.

In general, the safety brake apparatus for stopping a drive chain and a conveyor belt upon the failure of the drive chain has at least one drum engaging the conveyor belt. A ratchet assembly having a brake member attached thereto is mounted on the drum. A pawl bar is mounted juxtaposition to the ratchet assembly and a means for detecting a break in the drive chain is provided. Upon breakage of the drive chain, the detecting means causes the pawl bar to rotate and engage the ratchet such that the drive chain and conveyor are brought to a stop.

DESCRIPTION OF THE DRAWINGS

FIG. 1 is a top plan view of the improved conveyor belt safety brake apparatus.

FIG. 2 is a elevational view of the safety brake apparatus showing the interrelationship of the various components.

FIG. 3 is a cross-sectional view taken on line 3—3 of FIG. 2.

FIG. 4 is a side elevation of a portion of a conveyor belt system showing the drive chain and the ratchet assembly.

DESCRIPTION OF THE PREFERRED EMBODIMENTS

In general, a safety brake apparatus according to the concept of the present invention is generally indicated by the numeral 10. The safety brake apparatus can usually be applied to any conventional conveyor belt 11 or other load transporting system utilizing a belt. Conveyor belt 11 may be made out of any conventional material such as ply reinforced rubber and is mounted over a plurality of drums 12 some of which may be driven by a power source such as a motor (not shown) via a conventional drive chain 13. In order to ensure that good contact exists between the belt and the drive drum, a rubber lining 14 or other high frictional characteristic compound may be secured to the drum and engage the belt, FIG. 1.

In order to prevent damage to drive chain 13 due to continued movement upon failure, as well as load damage or personal injury to people, the safety brake apparatus may be utilized. As seen in FIG. 2, a ratchet assembly, generally indicated by the numeral 21, has recesses 22 designed to engage the pawl or pivot bar 31 when rotated in one direction. Although not shown, recesses 22 may be V shaped so that a properly aligned pawl or pivot bar will prevent rotation in either direction. The ratchet assembly may comprise three curvalinear sections which are slightly less than 120° of arc and are joined together and mounted about an eterior extension of drum 12 outwardly of belt 11 and drawn tight through nuts and bolts 23 and 24 which bear against end flanges 25. Of course, the ratchet assembly may contain various numbers of sections and the sections may be of various degrees of arc. As shown in FIG. 3, the cross-section of the ratchet of the preferred embodiment is T shaped Attached in any conventional manner to the radially inward surface of the ratchet assembly is a brake member 26. The brake member, which is made of conventional materials and can be a brake shoe, preferably engages or contacts the radially outward braking surface of the exterior extension of drum 12 so that upon the termination of rotation of the ratchet assembly, a selective frictional force is applied to the drum to cause it to cease rotation in a relatively short period of time. The amount of friction can be, of course, varied by the amount of torque applied to nuts and bolts 23 and 24 and generally is a trial and error procedure which depends upon such factors as the momentum of the belt and the weight of the goods normally carried on the belt.

As shown in FIG. 2, a pawl or pivot bar is mounted juxtaposition to the ratchet assembly. The pawl bar which may be square in cross-section is pivoted about a fulcrum pin 32 with a short end engaging portion 33 in alignment with the ratchet recesses 22 and the other or lever portion 34 attached to a pawl activating mechanism, generally indicated by the numeral 41. Preferably, the lever portion is longer in length than the engaging portion so that the pawl can be actuated simply by the release of the lever portion. Gravitation, will, of course, cause the lever portion to descend, thereby raising the engagement portion into contact with one of the ratchet recesses 22. Fulcrum pin 32 and the housing to which it is attached which may be a part of the conveyor framework (not shown) are designed to be able to readily withstand the force transmitted by the ratchet wheel without shearing or buckling.

As best seen in FIG. 4, a whisker type feeler switch, generally indicated by the numeral 36, is positioned just beneath the drive chain 13 so that upon breakage or the mistracking of the drive chain with the drums, the gravitational fall or the pendage of the chain will trip the feeler switch. Several such feeler switches may be installed throughout the length of the drive chain system so that quick detection of a chain belt failure is achieved.

The feeler switch is attached to any conventional type of pawl activating mechanism 41 which is capable of causing or releasing the lever portion of the pawl to move through a distance so that engaging portion 33 contacts the ratchet recesses 22. In the present embodiment, this action is achieved merely by letting lever portion 34 fall towards the earth. A specific type of mechanism which has been found to be suitable in this type of operation contains a conventional solenoid 46 which has a plunger bar 47 upon which lever portion 34 rests. As seen in FIG. 2, the plunger bar may be slidably supported by eye bolts 48 and tensioned in a fully extended portion by spring 49. Thus, when the drive train chain trips the feeler switch, the switch activates the solenoid causing it to retract plunger bar 47 which permits lever portion 34 to fall and, of course, causes engagement portion 33 to rise and contact ratchet assembly 21, as shown by the phantom lines of FIG. 2. Preferably, an interlocking circuit switch, generally indicated by the numeral 51, which upon tripping locks out the circuit or power to the drive chain motor, is positioned beneath the normal at rest position of the lever portion of the pawl so that the descent or fall of the lever portion will trip switch 51. Of course, other types of pawl activating mechanisms in interlocking circuit switches well known to those skilled in the art may be utilized within the spirit of the present invention.

In operation, upon detection of a drive chain failure by feeler switch 36 which activates the solenoid thereby causing the engagement portion of the pawl to contact the ratchet assembly, the engagement pawl portion will ride along the radially outward portion of the ratchet and then enter one of the recesses 22 to abruptly cease the rotation of the ratchet assembly. The drive chain motor will also have been stopped at this point in time by the tripping of interlocking circuit switch 51 by the fall of the lever portion of the pawl. The conveyor belt drive drum 12 will continue to turn for a short period of time until the frictional contact exerted by the brake shoe 26 causes the drum to stop. The time period of drum rotation is of course dependent primarily upon the amount of friction created by the brake shoe. Upon the stoppage of the conveyor belt, the drive chain may be repaired. Should the rotation of the ratchet assembly be in the opposite direction, the conveyor will coast to a halt since the drive chain motor has been cut-off and the engagement of the pawl bar will prevent motion in the reverse direction. Naturally, the ratchet assembly may contain shaped recesses to prevent motion in either direction.

It should thus be evident that a safety brake assembly constructed according to the concept of the present invention, as described herein accomplishes the aforementioned objectives and otherwise substantially improves safety brake conveyor art.

What is claimed is:

1. A safety brake apparatus for stopping a conveyor belt upon a drive chain failure, comprising:
    a conveyor belt,
    at least one drum engaging said conveyor belt;
    said drum having an exterior extension located outwardly of said belt;
    said exterior extension having a radially outward braking surface;
    a ratchet assembly mounted about said exterior extension braking surface;
    a brake member attached to the radial inner surface of said ratchet assembly and contacting said exterior extension braking surface with a selective frictional force;
    a pawl bar mounted juxtaposition to said ratchet; and
    a means for detecting a failure in the drive chain and activating said pawl to contact and stop said ratchet assembly so that said brake member applies a selective frictional force to said exterior extension braking surface to stop said drum, and also to cause said drive chain and said conveyor belt to stop in a relative short period of time.

2. The safety brake apparatus for stopping a conveyor belt upon a drive chain failure as in claim 1 wherein said ratchet assembly has recesses and said activated pawl contacts said recesses.

3. A safety brake apparatus for stopping a conveyor belt upon a drive chain failure as in claim 2, wherein said recesses contact said pawl when said ratchet wheel is rotating in only one direction.

4. A safety brake apparatus for stopping a conveyor belt upon a drive chain failure as in claim 1, wherein said ratchet assembly is a plurality of arcual sections joined together.

5. A safety brake apparatus for stopping a conveyor belt upon a drive chain failure as in claim 1, wherein said means for detecting a failure in the drive chain is a feeler switch, said feeler switch activated by breakage of the drive chain.

6. A safety brake apparatus for stopping a conveyor belt upon a drive chain failure as in claim 5, wherein said feeler switch is connected to a pawl activating mechanism which causes said pawl to contact said ratchet assembly.

7. A safety brake apparatus for stopping a conveyor belt upon a drive chain failure as in claim 6, wherein said pawl activating mechanism is a solenoid containing a retractable plunger bar.

8. A safety brake apparatus for stopping a conveyor belt upon a drive chain failure as in claim 7, wherein said pawl is a lever pivotally mounted and where one end of said pawl contacts said retractable plunger bar.

9. A safety brake apparatus for stopping a conveyor belt upon a drive chain failure as in claim 8, wherein said pawl is pivoted so that upon retraction of said plunger bar, said pawl in contacting said plunger bar falls under the influence of gravity.

10. A safety brake apparatus for stopping a conveyor belt upon a drive chain failure as in claim 9, wherein said feeler switch detects the failure in the drive chain and initiates said pawl activating mechanism.

11. A fail safe brake apparatus for stopping a load transporting system upon a drive means failure, comprising:

a load transporting system;
at least one drum engaging said load transporting system;
said drum having an exterior extension located outwardly of said load transporting system;
said exterior extension having a radially outward braking surface;
a ratchet assembly for applying frictional force mounted about said exterior extension braking surface;
a brake member attached to the radial inner surfaces of said ratchet assembly and contacting said exterior extension braking surface with a selective frictional force;
a pawl bar mounted juxtaposition to said ratchet, and
a means for detecting a failure in the drive means and activating said pawl to contact and stop said ratchet assembly so that said ratchet assembly applies a selective frictional force to said drum exterior extension braking surface to stop in a relatively short period of time the load transporting system.

12. A safety brake apparatus for stopping a conveyor belt upon a drive chain failure, comprising:
a conveyor belt;
a plurality of drums engaging said conveyor belt;
at least one of said drums driven by a conveyor chain and having a high frictional material thereon;
said high frictional drum having an exterior extension located outwardly of said belt;
said exterior extension having a radially outward braking surface;
a ratchet assembly mounted about at least one of said exterior extension braking surface; said ratchet assembly being T-shaped;
a brake member attached to the radial inner surfaces of said ratchet assembly and contacting said exterior extension braking surface with a selective frictional force;
a pawl bar mounted juxtaposition to said ratchet;
a means for detecting a failure in the drive chain and activating said pawl to contact said ratchet assembly so that said brake applies a selective frictional force to said exterior extension braking surface to cause said drum to stop in a relatively short period of time;
a drive chain motor;
an interlock switch connected to said drive chain motor and said pawl so that upon failure of said chain, said interlock switch turns off said drive chain motor.

* * * * *